March 10, 1931.  J. H. DEPPELER  1,795,332

METHOD OF WELDING LONG SEAMS

Filed Dec. 22, 1928

INVENTOR
John H. Deppeler
BY
HIS ATTORNEY

Patented Mar. 10, 1931

1,795,332

UNITED STATES PATENT OFFICE

JOHN H. DEPPELER, OF WEEHAWKEN, NEW JERSEY

METHOD OF WELDING LONG SEAMS

Application filed December 22, 1928. Serial No. 327,854.

The invention relates to certain improvements in the method of and apparatus for welding long seams in sheets, plates and the like, by means of superheated molten metal teemed into a mold which encloses the seam or joint, the primary object of the invention being to secure a substantially uniform welded seam which is effected by distributing the superheated molten metal progressively and substantially uniformly to the gap between the parts to be welded, so that all portions of the said parts will be subjected to substantially the same welding temperature.

A means for carrying out the method is illustrated in the accompanying drawings, in which:—

Figure 1:
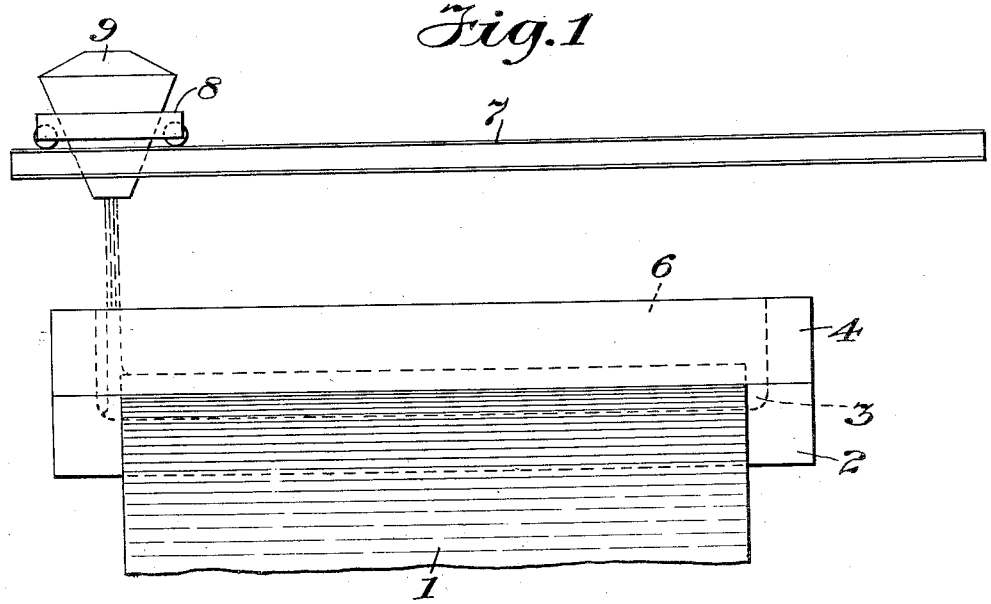
Figure 2:
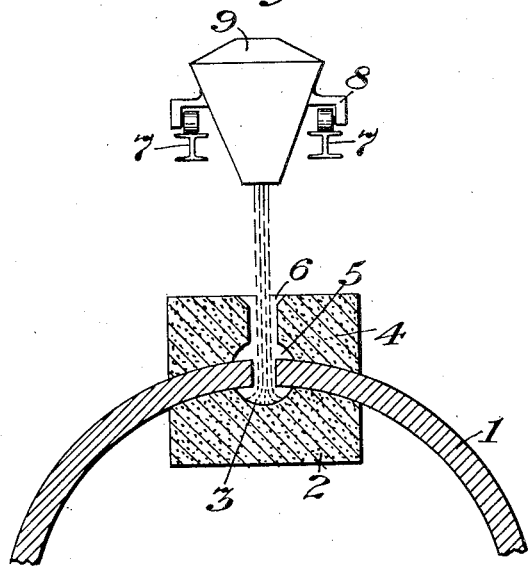

Fig. 1 is a side elevation of an apparatus for effecting a welded seam in a pipe section, and Fig. 2 is a sectional end elevation of same.

The regular procedure in making a thermit or other superheated molten metal weld is to provide a gap between the ends of the parts to be welded; to enclose these ends in a refractory mold having a space surrounding the ends to be welded; to preheat the mold and parts to be welded, which preheating is usually done by means of a flame directed into the lower part of the mold cavity; and, subsequently, to teem into the mold the superheated molten metal, usually thermit steel, through a pouring gate which enters the bottom of the mold and causes the metal to pass upward between and around the parts to be welded and, because of the superheat of the metal, fusing these ends and joining them strongly together.

When parts having one axis longer than the other are to be welded, it is customary to place the longer axis in a vertical position, so that the superheated molten metal travels upward in the mold cavity to the riser at the top of the mold. It is evident that, in such cases, the metal first entering the mold and thus first striking the lower part of the section to be welded gives up much of its superheat in the fusion of this lower part and this metal with little or no remaining superheat passes upward, part of it eventually getting into the riser and a part remaining in the weld between the upper parts of the sections. The result, therefore, is excessive fusion and washing away of the lower parts of the sections and too little fusion of the upper parts thereof. To avoid this, the welder resorts to additional entering gates, usually called connecting gates, which are approximately horizontal runners joining the mold space to the pouring gate. These gates are supposed to function as the metal fills up in the mold and in the pouring gate by allowing fresh, hot metal to pass over through the connecting gates into the mold space at various intervals in the height thereof, thus making the extent of the fusion more uniform along the vertical height of the weld.

In recent years, the thermit process has been employed to weld long seams in relatively heavy plate or sheet material, because other methods of joining these heavy sections have not proven entirely satisfactory, and the procedure, logically, has been the same as that outlined above, that is, the parts have been so arranged that the long seam will occupy a substantially vertical relation and the superheated molten metal is teemed in at the bottom of the mold and at numerous connecting gates along the length of the same, and, in order to make the heat as uniform as possible, these connecting gates have connected the mold space with the pouring gate at intervals of each foot of the vertical height of the mold cavity, so that, in the welding of a seam ten feet long, for example, there would be ten horizontal runners or gates connecting the pouring gate to the mold cavity.

Even this expedient of the multiple horizontal connecting gates between the pouring gate and the mold cavity has not proven entirely satisfactory, for the obvious reason that the greatest fusion occurs at each point where the metal enters the mold cavity and the extent of the fusion decreases as the molten metal progresses in the mold cavity beyond the point of entrance and this variation in the fusion of the welded seam causes a variation in the shrinkage strains when the weld solidifies, which greatly reduces the strength of the finished weld.

According to the present invention, the difficulties and objections to the former methods of forming relatively long welded seams are obviated by placing the parts to be welded in horizontal position, providing a long horizontal mold section below the parts of the joint, which partly encloses the edges of the sections throughout the length of the seam, and providing a second mold section above the seam with a longitudinal pouring gate in said section of substantially the length of the seam. Then, after having preheated the edges of the plates or sections within the mold and thoroughly drying out the refractory mold sections, a crucible with its charge of thermit or other superheated molten metal, and preferably provided with a bottom discharge opening, is brought over the pouring gate and moved longitudinally thereof, so that the molten metal will be progressively delivered through the gate and will pour down between the two edges of the sections to be welded and progressively fill the mold cavity from one end to the other. Preferably the rate of movement of the crucible above the mold, while the metal is being teemed into the latter, is approximately equal to the rate at which the metal tends to flow horizontally when confined in the mold, the result being that all parts of the plates or sections to be seam welded are subjected to substantially the same welding temperature.

Referring to the drawings, 1 indicates a large pipe section of relatively heavy sheet metal, the edges of which are to be seamed by a welded joint. Mounted on the inside of the pipe section adjacent the gap between the edges of the sheet is a mold section 2 having a cavity 3, which extends for at least the length of the pipe. Mounted upon the top of the pipe 1 is a second mold section 4 which is provided with a cavity 5 similar to 3 and substantially coextensive in length to the latter. Opening into the cavity 5 is a longitudinal pouring gate 6 which is of substantially the same length as said cavity.

Supported by any suitable means above and preferably parallel with the mold is a track 7 upon which operates a wheeled truck 8, which carries a crucible 9, preferably of the usual type employed in thermit welding and having a bottom discharge opening, which directs the molten metal into the pouring gate 6, as the truck carrying the crucible is moved along the track, so that the molten metal is progressively delivered through the gate directly into the mold cavity and reaches all parts of the sections to be welded at approximately the same temperature, so that a uniformly welded seam results.

It will be understood that this particular form of apparatus is merely exemplary and illustrates only one of many obvious variations in the apparatus for effecting long welded seams or joints between relatively heavy metal plates, sheets or similar forms.

From the foregoing, it will be apparent that this method of welding possesses several important advantages over the former methods. In the first place, the amount or extent of the fusion at all points in the length of the seam will be approximately uniform and the resultant weld will be of substantially uniform strength throughout. Furthermore the method affords a material element of economy as compared with the former method involving the multiple horizontal connecting gates between the pouring gate and the mold cavity, because, when the latter is employed, the amount of superheated molten metal necessary to fill the pouring gate, connecting gates and riser, is at least equal to the amount remaining in the weld and, therefore, represents a loss of at least 50% of the original amount of molten metal which has to be removed by machining. Under the method of the present invention, however, only that amount of molten metal, thermit steel, necessary to fill the mold cavity and effect the weld is required and, therefore, welds and seams of this character may be effected with a saving of at least one-half of the quantity of molten metal heretofore employed and with a complete avoidance of machining or removing the surplus metal in the gates and risers.

This item of the saving of the thermit or other superheated molten metal is of the greatest importance because it not only renders the welding of heavy plates more economical, but it broadens the field of application of this general mode of welding and seaming, so that the method may be successfully applied to the welding of thinner plates and sheets, the expense of which, under the methods heretofore employed, is prohibitive.

A further advantage lies in the great saving in labor and, to a certain extent, in the saving of molding material. The labor saving is due to the greater ease with which the work can be carried out with the part or parts upon which the operation is to be performed supported on or close to the floor or ground in horizontal position, thereby avoiding the necessity of supporting scaffolds or platforms for the mold and the work, and elaborate machinery for raising and lowering the crucibles containing the molten metal. Furthermore, the method avoids the potential danger, which is always present in the practice of the former methods involving the placing of the relatively long work in a vertical position to effect the weld, in which the proximity of the thermit crucible, when mounted above the mold, to the roof of the building, will be liable to damage the same because of the great heat developed and the emission of sparks during the alumino-thermic reaction. To avoid this contingency, it has even been necessary to restrict the length of the seam to be welded or to make an excavation in the floor of the foundry to receive the part or parts to be welded and the mold surrounding the weld, which, of course, involves a large element of labor and expense, all of which are obviated by the method and apparatus of the present invention.

As hereinbefore indicated, the particular apparatus described and illustrated is merely exemplary, and it is understood that the invention is not limited to any special form of apparatus nor to any specific means for effecting the necessary relative movement between the container of the superheated molten metal and the mold, together with the parts enclosed therein, as it is obvious that either the crucible or the enclosed parts, or both, may be moved to effect the progressive and uniform delivery of the molten metal to the mold and the consequent uniform heating and fusion of the parts to be welded. It has been found preferable, however, that the rate of relative movement between the metal container and the mold should be about equal to that at about which the molten metal tends to flow horizontally in the mold and this rate will vary depending upon the size of the annular space surrounding the edges of the material to be welded and the viscosity of the molten metal.

What I claim is:

1. The method of welding long seams in sheets, plates and the like, which comprises separating the edges of the parts by a gap, surrounding the gap and the edges by mold sections one of which has a pouring gate substantially the length of and parallel with the gap, and teeming superheated molten metal progressively along the length of said gate by relative movement of the source of supply of the molten metal and the mold encased parts in the longitudinal direction of the gap.

2. The method of welding long seams in sheets, plates and the like, which comprises separating the edges of the parts by a horizontally disposed gap, surrounding the gap and the edges by mold sections one of which has a pouring gate substantially the length of and parallel with the gap, and teeming superheated molten metal progressively along the length of said gate by relative movement of the source of supply of the molten metal and the mold encased parts in the longitudinal direction of the gap.

3. The method of welding long seams in sheets, plates and the like, which comprises separating the edges of the parts by a gap, surrounding the gap and edges by mold sections one of which has a pouring gate substantially the length of and parallel with the gap, and teeming superheated molten metal into the mold by moving the source of supply of said molten metal progressively along and above said gate.

In testimony whereof I affix my signature.

JOHN H. DEPPELER.